April 4, 1944.　　　　J. L. HARDY　　　　2,345,972
MOTOR VEHICLE
Filed May 7, 1941　　　　2 Sheets-Sheet 2
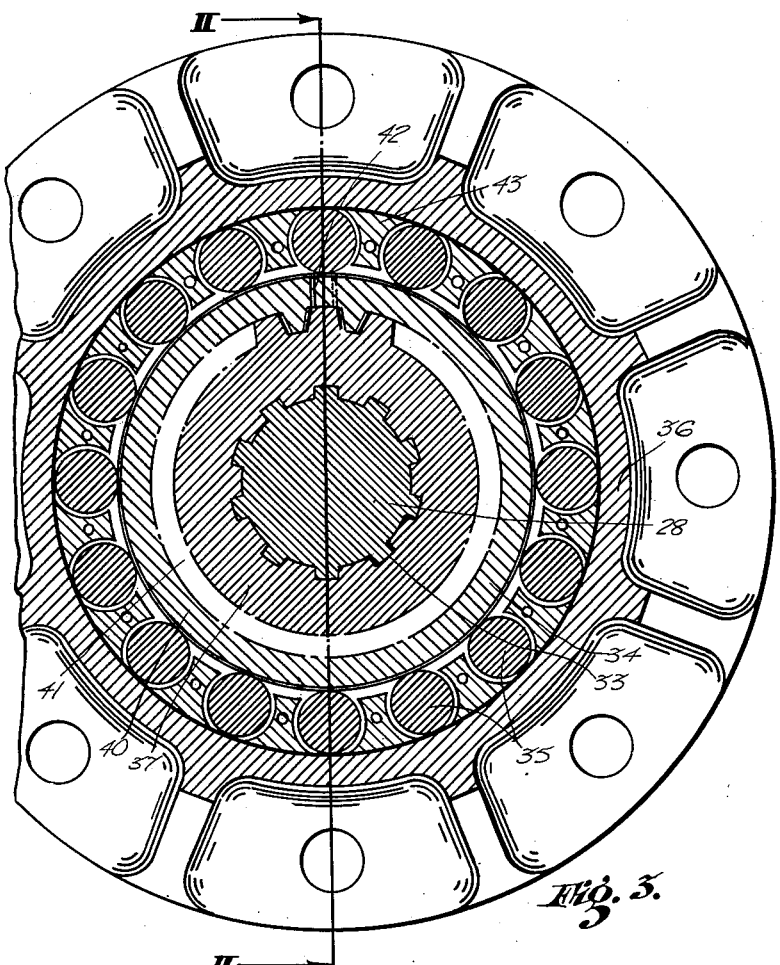
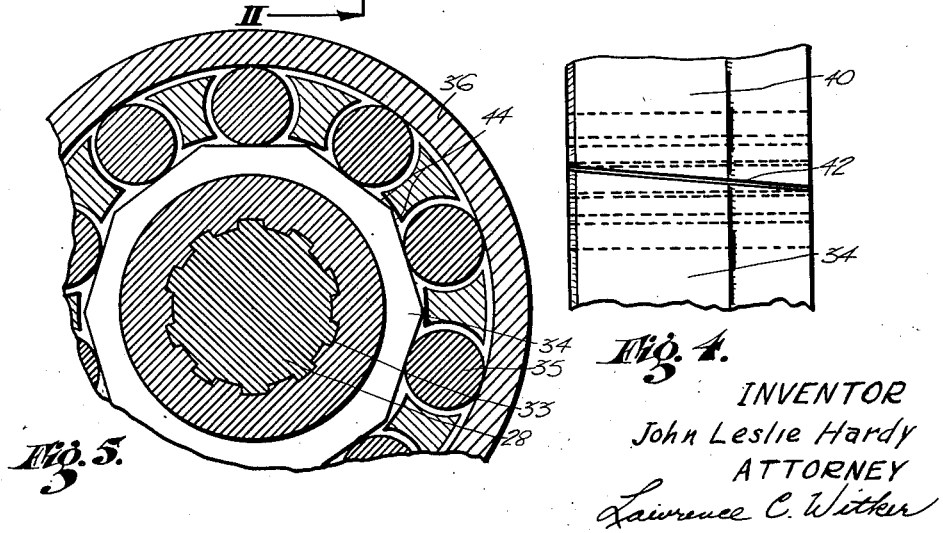
INVENTOR
John Leslie Hardy
ATTORNEY
Lawrence C. Witker Patented Apr. 4, 1944

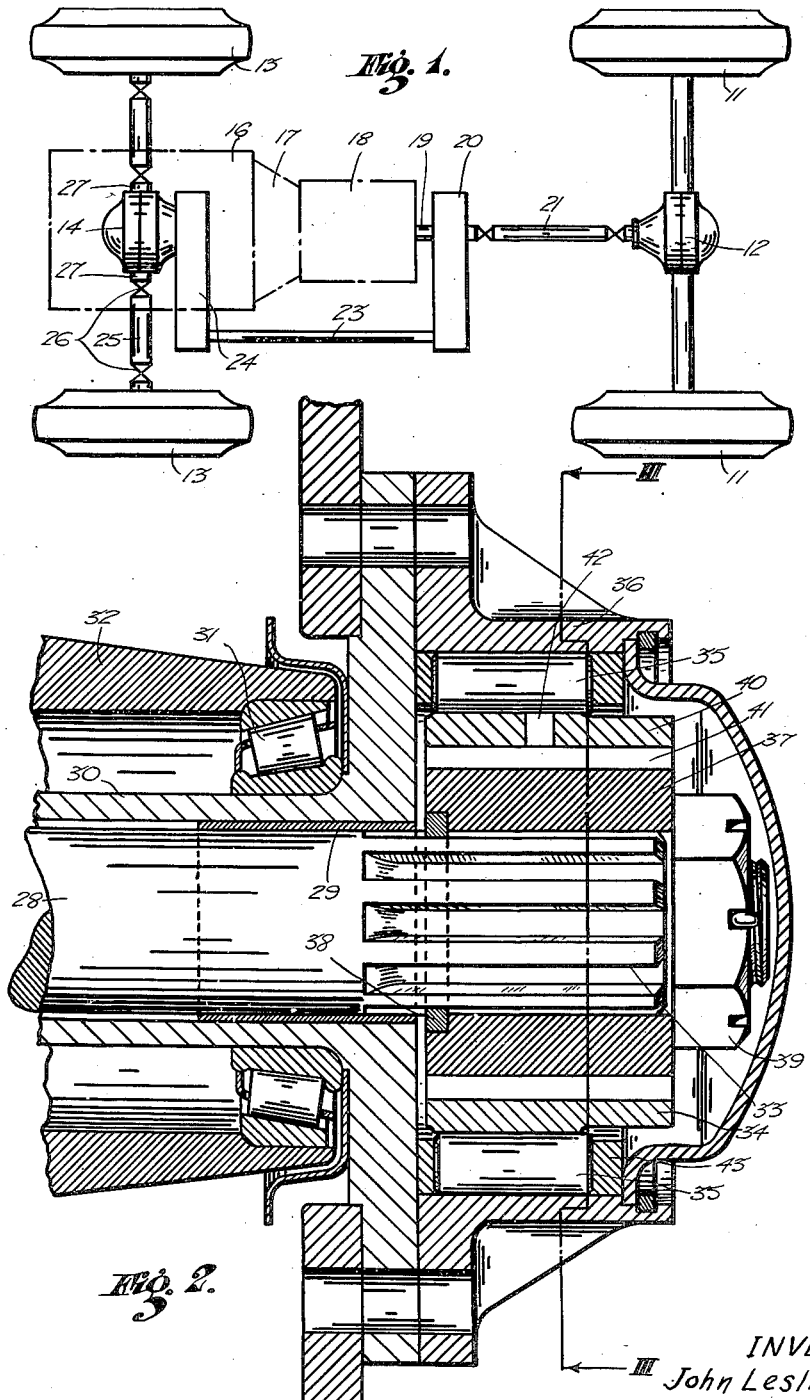

2,345,972

UNITED STATES PATENT OFFICE 2,345,972

MOTOR VEHICLE

John Leslie Hardy, Birmingham, England, assignor to Spicer Manufacturing Corporation, Toledo, Ohio Application May 7, 1941, Serial No. 392,259
In Great Britain April 8, 1940

1 Claim. (Cl. 192—50)

This invention relates to military and other motor-vehicles of the kind such as have at least one pair of road wheels which are differentially driven and, in addition, at least a second pair which can be differentially driven when required. Usually it is a pair of rear wheels which are the normal driving ones, a pair of front wheels being additionally driven when required.

In a common arrangement of such a vehicle, the engine, clutch and change-speed mechanism are disposed at the front of the vehicle, and the drive from the change-speed mechanism is taken to a distributor box from which it passes to the rear differential gearing or gearings. The distributor box provides means whereby, for the lower-speed ratios (preferably for only the first of the forward "speeds"), the drive can be taken to the front differential gearing so that a very high tractive effort can be obtained for the first gear position. The distributor box, in fact, may be arranged to provide the first gear ratio to the back axles, as well as to couple in the front axles when first "speed" is introduced.

The main object of the present invention is the provision of clutching means for preventing the said second pair of wheels from driving through to the differential gearing therefor when no drive is being transmitted from the latter to the said second pair of wheels.

For an understanding of this and other objects and advantages of the invention attention should be directed to the following description in which reference is made to the accompanying sheets of drawings, wherein:

Figure 1 is a diagrammatic plan view (omitting the chassis-frame) of a vehicle chassis of the type above specified to which the invention is applied;

Figure 2 is a fragmentary sectional elevation of one of the front wheels thereof incorporating one form of clutching means according to the invention;

Figure 3 is a cross-section taken on the line III—III of Figure 2;

Figure 4 is a fragmentary plan of a part of the construction shown in Figures 2 and 3; and Figure 5 is a cross-section through one of the front wheels incorporating an alternative form of clutch according to the invention.

Figure 1 indicates a vehicle chassis with rear road wheels 11 permanently driven from a differential gearing within the back axle casing 12 and with steerable front road wheels 13 which can be driven, through a differential gearing within the casing 14, when a high tractive effort is required. The engine 16, clutch 17 and main gear-box 18 may be of unit construction, in known manner, and mounted at the front of the chassis, driving through a short shaft 19 to a distributor box 20 from which the drive is taken by a propeller shaft assembly 21 to the rear differential gearing. From the distributor box the drive can also be taken by a shaft 23 and gearing or the like within a casing 24 to the front differential gearing, the latter driving to the front wheels by half axles 25 and universal joints 26. The gear shift means for the main gear-box 18 and for the clutch in the distributor box (whereby the shaft 23 can be clutched in for low-speed ratios) is not shown, as it conforms with standard practice.

In carrying out the invention, as applied to the vehicle chassis of Figure 1, if space allows the clutching means may be associated with the two output shafts 27 of the front differential gear. The clutching means may, of course, take the form of mechanically-controlled dog clutches or of automatic one-way driving devices—for example, roller-type free-wheel clutches—such as are well known in the art. In this event, however, the shafts 25 and the universal joints 26 will be continuously turned by the rotation of the front wheels when these are not being driven, i. e., when other "speeds" than first are engaged, and for preference, therefore, the clutching means are incorporated nearer the front wheels.

In a preferred arrangement according to the invention, as shown by Figures 2 to 5, the clutching means, in the form of free-wheel clutches are actually incorporated in the front wheels. Each stub axle 28 is journalled in any convenient manner, as by means of a plain bearing 29, in the wheel hub 30, which latter is in turn journalled, as by a taper roller bearing 31, in a hub assembly 32 adapted to be steered. The stub axle has a splined or other driving connection 33 with a sleeve device 34 on the axially outer side of the hub assembly, which sleeve device forms part (the inner part) of a free-wheel clutch incorporating rollers 35, the other (outer) part of the free-wheel clutch being formed by a part 36 of the wheel hub itself.

The invention further consists in the use of such clutching means both for a low-speed forward ratio and for the reverse drive, and in this event the clutching means, if an automatic one, is of the reversible type, as is actually illustrated in Figures 2 to 5.

Thus, in Figures 2 to 4, which show a preferred arrangement of automatically-reversible freewheel, the sleeve device 34 comprises two portions, an inner portion 37 which is fast on the splines 33, being endwise located thereon by means of a circlip 38 and an end nut 39, and an outer portion 40 which loosely engages splines 41 on the inner portion 37. The outer portion has an oblique split 42 in it, and it has sufficient resiliency in it to allow of the rollers 35, located in the cage 43 which is a running fit in the hub part 36, rolling thereover when overrunning is to occur. When the front differential gearing is driving, however, either for the first forward speed or the reverse drive, the corresponding rotation of the stub axle 28 and of the inner portion 37 takes up the slack in the engaging splines 41 and owing to these being of tapered section thereby expands the outer portion 40, thus causing the latter to bind on the rollers and drive the wheel hub in the appropriate direction.

In the form of automatically-reversible freewheel shown by Figure 5, in which the sleeve device 34 is fast on the stub axle splines 33, the surface of the sleeve device is of regular polygonal shape, and with each flat 44 there coacts one of the rollers 35 in a well understood manner.

In this way, when any "speed" but first (or reverse) is engaged, overrunning will occur, and all the shafts and joints between the front wheels and the distributor box can remain stationary. When first "speeds" (or reverse) is engaged, however, the drive to the front wheels is automatically taken up by the free-wheel clutches.

What I claim as my invention and desire to secure by Letters Patent of the United States is:

In a motor vehicle, a road wheel journalled in a hub assembly, said road wheel having a hub providing the outer part of an automatically reversible roller-type free-wheel, a sleeve device forming the inner part of said free-wheel, a drive shaft journalled in the hub of the road wheel, said sleeve device comprising an inner portion fast on the drive shaft, and a split outer portion having a loose splined engagement with said inner portion, the associated outer part having a circular inner periphery and said outer portion having a circular external periphery between which two peripheries the rollers coact, said rollers being carried by a cage which has a running fit on the inner periphery of said outer part.

JOHN L. HARDY.